(12) United States Patent
Fukunaga

(10) Patent No.: US 9,188,841 B2
(45) Date of Patent: Nov. 17, 2015

(54) IMAGING DEVICE

(75) Inventor: Yasuhiro Fukunaga, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 8 days.

(21) Appl. No.: 13/083,116

(22) Filed: Apr. 8, 2011

(65) Prior Publication Data
US 2011/0249159 A1    Oct. 13, 2011

(30) Foreign Application Priority Data

Apr. 12, 2010  (JP) .................................. 2010-091350

(51) Int. Cl.
*H04N 9/04*     (2006.01)
*G03B 17/00*    (2006.01)

(52) U.S. Cl.
CPC .............. *G03B 17/00* (2013.01); *H04N 9/045* (2013.01)

(58) Field of Classification Search
CPC .. G02B 5/201; G02B 5/285; H01L 27/14625; H01L 31/02165; H01L 27/14621; H04N 9/045; H04N 5/332
USPC ................................................ 348/268–280
See application file for complete search history.

(56) References Cited

U.S. PATENT DOCUMENTS

| | | | | |
|---|---|---|---|---|
| 6,023,540 A * | 2/2000 | Walt et al. | ......................... | 385/12 |
| 7,121,669 B2 * | 10/2006 | Iisaka | ............................. | 353/84 |
| 7,289,233 B2 * | 10/2007 | Kurokawa et al. | ............ | 356/630 |
| 2005/0163982 A1 * | 7/2005 | Ono et al. | ...................... | 428/209 |
| 2006/0164720 A1 * | 7/2006 | Yoshida et al. | ................ | 359/359 |
| 2006/0187381 A1 * | 8/2006 | Yokozawa | ...................... | 349/106 |
| 2008/0135740 A1 * | 6/2008 | Matsuda et al. | ............... | 250/226 |
| 2008/0180665 A1 * | 7/2008 | Redman et al. | ................ | 356/326 |
| 2008/0212091 A1 * | 9/2008 | Tanaka et al. | .................. | 356/327 |

(Continued)

FOREIGN PATENT DOCUMENTS

| | | |
|---|---|---|
| JP | 64-9326 A | 1/1989 |
| JP | 11-289073 A | 10/1999 |

(Continued)

OTHER PUBLICATIONS

K. Ietomi et al.,"Experimental Evaluation of color image estimation method using multipoint spectrum measurements", Papers 27a-SB-6 of the 54th meeting of the Japan Society of Applied Physics with English Translation thereof.

(Continued)

*Primary Examiner* — Roberto Velez
*Assistant Examiner* — Tuan Le
(74) *Attorney, Agent, or Firm* — Westerman, Hattori, Daniels & Adrian, LLP

(57) ABSTRACT

An imaging device is provided with a color sensor including a first color sensor pixel and a second color sensor pixel. The first color sensor pixel includes a first color filter made from a first material, a second color filter made from a second material and superimposed on the first color filter, and a first color sensor element that is superimposed on the first color filter and the second color filter, and receives light that has passed through them. The second color sensor pixel includes a third color filter made from the first material, a fourth color filter made from the second material, superimposed on the third color filter, and having a different thickness to that of the second color filter, and a second color filter element that is superimposed on the third color filter and the fourth color filter, and receives light that has passed through them.

7 Claims, 8 Drawing Sheets

(56) References Cited

U.S. PATENT DOCUMENTS

| | | | |
|---|---|---|---|
| 2008/0251873 A1* | 10/2008 | Kasano et al. | 257/432 |
| 2008/0266563 A1* | 10/2008 | Redman et al. | 356/406 |
| 2009/0201371 A1* | 8/2009 | Matsuda et al. | 348/148 |
| 2009/0218516 A1* | 9/2009 | Gryczynski et al. | 250/459.1 |
| 2009/0250778 A1* | 10/2009 | Shimotsusa | 257/432 |
| 2009/0256927 A1* | 10/2009 | Komiya et al. | 348/222.1 |
| 2009/0298220 A1* | 12/2009 | Anderson et al. | 438/70 |
| 2010/0003792 A1* | 1/2010 | Lai et al. | 438/160 |

FOREIGN PATENT DOCUMENTS

| | | |
|---|---|---|
| JP | 2002-94037 A | 3/2002 |
| JP | 2007-103401 A | 4/2007 |
| JP | 4043662 B2 | 2/2008 |
| JP | 2009-182845 A | 8/2009 |
| JP | 2011-61134 A | 3/2011 |
| WO | 2005/069376 A1 | 7/2005 |

OTHER PUBLICATIONS

Japanese Office Action dated Dec. 17, 2013, issued in corresponding Japanese Patent Application No. 2010-091350 with English translation (9 pages).

Japanese Office Action dated May 13, 2014, issued in corresponding Japanese Patent Application No. 2010-091350 with English translation (12 pages).

* cited by examiner

IMAGING DEVICE

BACKGROUND OF THE INVENTION

1. Field of the Invention

The present invention relates to an imaging device.

Priority is claimed on Japanese Patent Application No. 2010-091350, filed Apr. 12, 2010, the content of which is incorporated herein by reference.

2. Description of Related Art

To finely detect spectral information of a subject, an imaging wavelength region must be divided into a greater number of fine channels. These pieces of spectral information of the divided channels are then combined to obtain spectral information of the subject. An imaging device that uses this method to acquire multispectral information of a subject is known in the related art (e.g. see Japanese Patent No. 4043662).

FIG. 13 is a block diagram of the configuration of a multispectral imaging device of the related art. In the example of FIG. 13, a multispectral imaging device 60 includes a liquid crystal tunable filter 61, an imaging element 62, a liquid crystal tunable filter controller 63, and an image processor 64. The liquid crystal tunable filter controller 63 controls the spectral transmissivity of the liquid crystal tunable filter 61 such that the liquid crystal tunable filter 61 transmits light of a wavelength that is of interest. Light of a wavelength that passed through the liquid crystal tunable filter 61 is imaged by the imaging element 62, and processed by the image processor 64, whereby the multispectral imaging device 60 acquires a multispectral image of the subject.

FIG. 14 is a graph of an example of spectral characteristics of the liquid crystal tunable filter 61 of the related art. As shown in FIG. 14, due to the control conducted by the liquid crystal tunable filter controller 63, the liquid crystal tunable filter 61 can transmit light of a wavelength that finely divides the imaging wavelength region.

Furthermore, as a method of acquiring multispectral information with a simpler device, a technique of using a miniature spectrometer fitted to an RGB camera to measure the spectrum of a subject at a great many points, and use that information to enhance the color reproducibility from an RGB image is known in the prior art (e.g. see Papers 27a-SB-6 of the 54$^{th}$ meeting of the Japan Society of Applied Physics, 'Experimental evaluation of color image estimation method using multipoint spectrum measurements').

FIG. 15 is a schematic diagram of the configuration of an imaging device provided with a miniature spectrometer of the related art. In the example of FIG. 15, an imaging device 70 includes an object lens 71, a mirror 72, an RGB image sensor 73, a miniature spectroscope 74, and an image processor 75. The RGB image sensor 73 acquires spatial information of a sample with more minute pixels. To detect highly precise changes in the spectral information, the miniature spectroscope 74 is configured with larger pixels than the RGB image sensor 73.

Light illuminated onto a sample 80 passes through the object lens 71 and is divided into two directions by the mirror 72. One beam of light divided by the mirror 72 is received by the RGB image sensor 73, and the other beam is received by the miniature spectroscope 74.

According to the above configuration, a multispectral imaging device can be configured with a simple configuration wherein spatial information is acquired by an RGB image sensor and color information is acquired by a miniature spectroscope.

SUMMARY OF THE INVENTION

The present invention provides an imaging device that can highly precisely acquire spectral information of a subject.

According to a first aspect of the present invention, an imaging device is provided with a color sensor including a first color sensor pixel and a second color sensor pixel. The first color sensor pixel includes a first color filter made from a first material, a second color filter made from a second material and superimposed on the first color filter, and a first color sensor element that is superimposed on the first color filter and the second color filter, and receives light that has passed through the first color filter and the second color filter. The second color sensor pixel includes a third color filter made from the first material, a fourth color filter made from the second material, superimposed on the third color filter, and having a different thickness to that of the second color filter, and a second color filter element that is superimposed on the third color filter and the fourth color filter, and receives light that has passed through the third color filter and the fourth color filter.

Preferably, the thicknesses of the first to the fourth color filters are set such that the peak value of the wavelength distribution of light detected by the first color sensor pixel, and the peak value of wavelength distribution of light detected by the second color sensor pixel, are within a predetermined wavelength band that enables variation in predetermined color information to be extracted.

According to a second aspect of the present invention, the imaging device includes an image sensor including a plurality of image sensor pixels that acquires an image of a sample, and an optical system that forms an image of light from the sample at the image sensor, and receives the light at the color sensor.

Preferably, the color sensor includes a plurality of the color sensor pixels including the first color sensor pixel and the second color sensor pixel. The plurality of image sensor pixels are arranged in a Bayer pattern, and the plurality of color sensor pixels are arranged at a predetermined cycle in the Bayer pattern.

Preferably, the optical system includes a pinhole optical system which makes the color sensor receive only a part of the light from the sample.

Preferably, the optical system includes an integrating sphere optical system which mixes light from the sample and makes the color sensor receive the mixed light.

Preferably, the optical system includes a fiber optical system which mixes light from the sample and makes the color sensor receive the mixed light.

DETAILED DESCRIPTION OF THE INVENTION

First Embodiment

Figure 1:
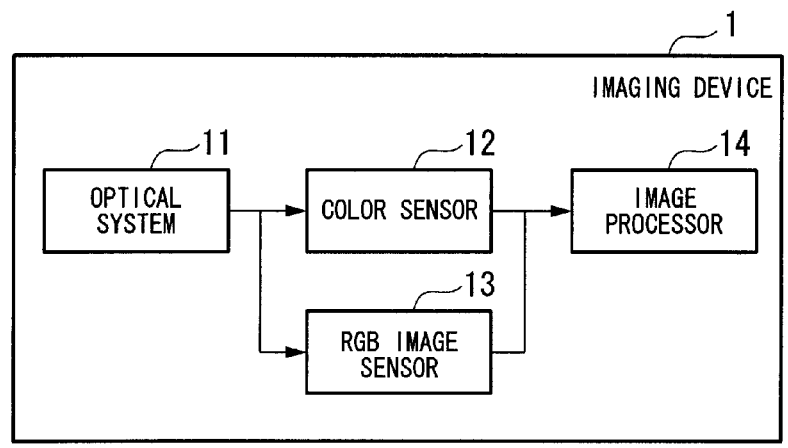
FIG. 1 is a block diagram of the configuration of an imaging device in a first embodiment of the present invention.

A first embodiment of an imaging device of the present invention will be explained with reference to the drawings. FIG. 1 is a block diagram of the configuration of an imaging device in this embodiment. In the example of FIG. 1, an imaging device 1 includes an optical system 11, a color sensor 12, an RGB image sensor 13 (image sensor), and an image processor 14. The optical system 11 forms an optical image of a subject on a light-receiving face of the color sensor 12 and an imaging face of the RGB image sensor 13. The color sensor 12 detects spectral information of the subject. The RGB image sensor 13 includes an R pixel (a pixel that detects red light), a G pixel (a pixel that detects green light), and a B pixel (a pixel that detects blue light), and acquires an image of the subject. The RGB image sensor 13 used in this embodiment is not a multiband image sensor; it is an RGB image sensor generally used in imaging devices.

Based on the spectral information of the subject detected by the color sensor 12, the image processor 14 determines the type of incident light. It then corrects the image of the subject acquired by the RGB image sensor 13 in accordance with the type of the incident light, and outputs image data. A general correction method is used for this correction.

Figure 2:
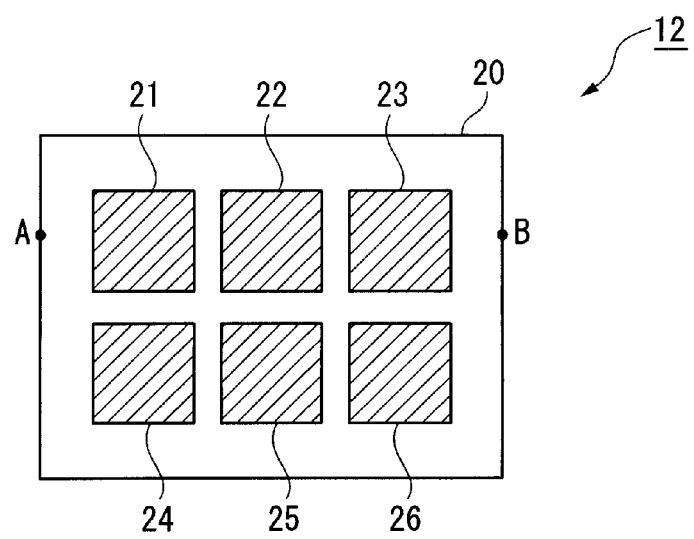
FIG. 2 is a schematic diagram of the arrangement of color sensor pixels of a color sensor in a first embodiment of the present invention.

Subsequently, the pattern of the color sensor pixels of the color sensor 12 will be explained. FIG. 2 is a schematic diagram of the arrangement of color sensor pixels 21 to 26 of the color sensor 12 in this embodiment. In the example of FIG. 2, the color sensor 12 includes color sensor pixels 21 to 26 provided on a semiconductor substrate 20. The color sensor pixels 21 to 26 detect lights of different wavelengths. The configurations of the color sensor pixels 21 to 26 will be explained later.

Since each of the color sensor pixels 21 to 26 detects light of a specific wavelength, the color sensor 12 thus configured can detect the intensity of light of each wavelength contained in the incident light. Accordingly, when the imaging device 1 is provided with this color sensor 12, it can determine the type of the incident light (e.g. sunlight, fluorescent light, etc.) based on the intensity of each wavelength.

Figure 3:
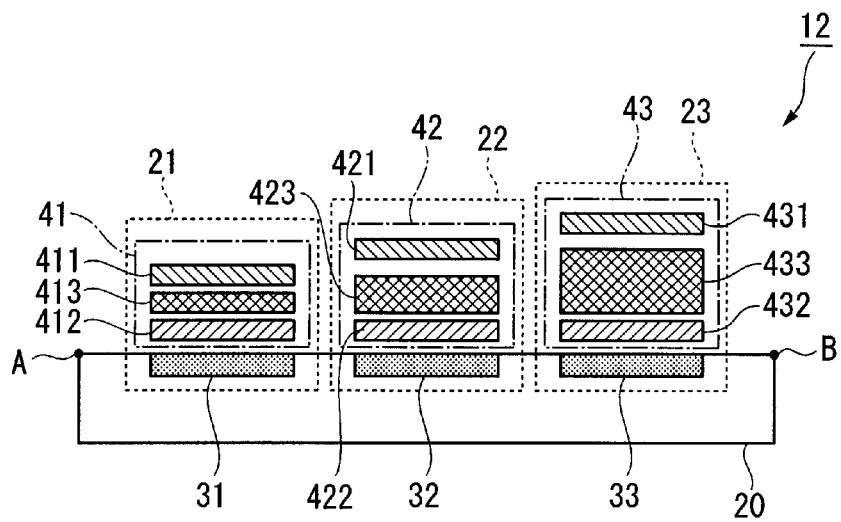
FIG. 3 is a cross-sectional diagram of color sensor pixels of a color sensor in a first embodiment of the present invention.

FIG. 3 is a cross-sectional diagram of the color sensor pixels 21 to 23 of the color sensor 12 in this embodiment. The example of FIG. 3 shows a cross-section from point A to point B shown in the schematic view of the color sensor 12 shown in FIG. 2. The color sensor pixel 21, the color sensor pixel 22, and the color sensor pixel 23 are disposed on the semiconductor substrate 20.

The color sensor pixel 21 (first color sensor pixel) includes a color sensor element 31 (first color sensor element) and a color filter group 41. The color filter group 41 is arranged above the light-receiving face of the color sensor element 31. The color filter group 41 includes a color filter 411 (first color filter) that is made from a first material and transmits only light of a wavelength in a first wavelength band, a color filter 412 that is made from a third material and transmits only light of a wavelength in a second wavelength band, and a color filter 413 (second color filter) that is made from a second material and transmits only light of a wavelength in a third wavelength band.

Various types of material can be used for the color filter, such as nonorganic or organic. Recently, pigment-type material is more commonly used for color filters than dyeing-type, and enables the transmission band wavelength to be varied by changing the material composition of the colored resin layer.

The color filter 411, the color filter 412, and the color filter 413 are arranged in a superimposed state. Specifically, the color filter 411 is arranged above the light-receiving face of the color sensor element 31. The color filter 412 is arranged between the color sensor element 31 and the color filter 411. The color filter 413 is arranged between the color filter 411 and the color filter 412. The optical image of the subject formed by the optical system 11 thus passes through the color filter 411, the color filter 413, and the color filter 412 in that sequence, and is then incident to the color sensor element 31. That is, only light of the first wavelength band and the second wavelength band and the third wavelength band is incident to the color sensor element 31.

The color sensor pixel 22 (second color sensor pixel) includes a color sensor element 32 (second color sensor element) and a color filter group 42. The color filter group 42 is arranged above the light-receiving face of the color sensor element 32. The color filter group 42 includes a color filter 421 (third color filter) that is made from a first material and transmits only light in a first wavelength band, a color filter 422 that is made from a third material and transmits only light in a second wavelength band, and a color filter 423 (fourth color filter) that is made from a second material and transmits only light in a fourth wavelength band. The color filter 423 is thicker than the color filter 413. Consequently, the wavelength band of light transmitted by the color filter 413 is different from the wavelength band of light transmitted by the color filter 423.

The color filter 421, the color filter 422, and the color filter 423 are arranged in a superimposed state. Specifically, the color filter 421 is arranged above the light-receiving face of the color sensor element 32. The color filter 422 is arranged between the color sensor element 32 and the color filter 421. The color filter 423 is arranged between the color filter 421 and the color filter 422. Consequently, an optical image of the subject formed by the optical system 11 passes through the color filter 421, the color filter 423, and the color filter 422 in that sequence, and is then incident to the color sensor element 32. That is, only light in the first wavelength band and the second wavelength band and the fourth wavelength band is incident to the color sensor element 32.

The color sensor pixel 23 includes a color sensor element 33 and a color filter group 43. The color filter group 43 is arranged above the light-receiving face of the color sensor element 33. The color filter group 43 includes a color filter 431 that is made from a first material and transmits only light in a first wavelength band, a color filter 432 that is made from a third material and transmits only light in a second wavelength band, and a color filter 433 that is made from a second material and transmits only light of a fifth wavelength band. The color filter 433 is thicker than the color filter 423. Consequently, the wavelength band of light transmitted by the color filter 433 is different from the wavelength band of light transmitted by the color filter 423.

The color filter 431, the color filter 432, and the color filter 433 are arranged in a superimposed state. Specifically, the color filter 431 is arranged above the light-receiving face of the color sensor element 33. The color filter 432 is arranged between the color sensor element 33 and the color filter 431. The color filter 433 is arranged between the color filter 431 and the color filter 432. Consequently, an optical image of the subject formed by the optical system 11 passes through the color filter 431, the color filter 433, and the color filter 432 in that sequence, and is then incident to the color sensor element 33. That is, only light of the first wavelength band and the second wavelength band and the fifth wavelength band is incident to the color sensor element 33.

Figure 4:
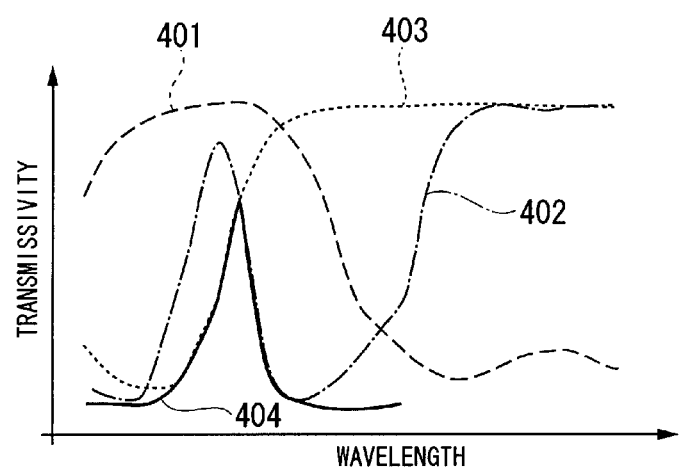
FIG. 4 is a graph of spectral characteristics of a color filter group of a color sensor pixel in a first embodiment of the present invention.

Subsequently, spectral characteristics of the color filter group 41 will be explained. FIG. 4 is a graph of the spectral characteristics (transmissivity of light) of the color filter group 41 of the color sensor pixel 21 in this embodiment. In FIG. 4, the horizontal axis represents the wavelength of the light, and the vertical axis represents the transmissivity of the light. Curved line 401 represents the spectral characteristics of the color filter 411 of the color filter group 41. Curved line 402 represents the spectral characteristics of the color filter 412 of the color filter group 41. Curved line 403 represents the spectral characteristics of the color filter 413 of the color filter group 41. Curved line 404 represents the superimposed spectral characteristics of the color filter 411, the color filter 412, and the color filter 413, i.e. the spectral characteristics of the color filter group 41.

As shown in FIG. 4, when the color filter 411, the color filter 412, and the color filter 413 are superimposed, the color filter group 41 can obtain the spectral characteristics indicated by the curved line 404.

Figure 5:
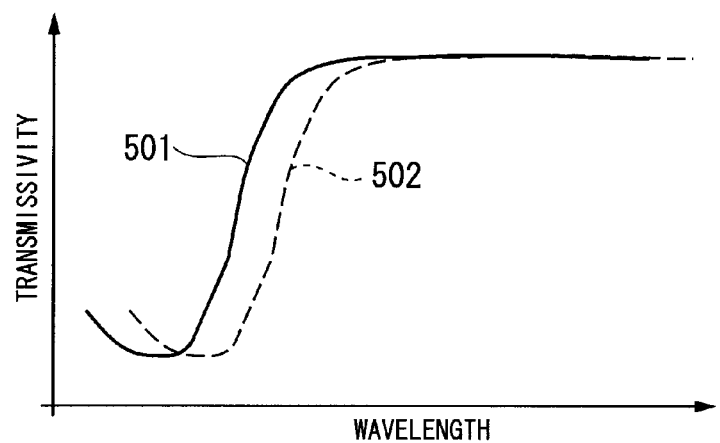
FIG. 5 is a graph of spectral characteristics of a color filter of a color filter group in a first embodiment of the present invention.

Subsequently, the spectral characteristics of the color filter 413 of the color filter group 41, and the spectral characteristics of the color filter 423 of the color filter group 42, will be explained. FIG. 5 is a graph of spectral characteristics of the color filter 413 of the color filter group 41, and spectral characteristics of the color filter 423 of the color filter group 42, in this embodiment.

In FIG. 5, the horizontal axis represents the wavelength of the light, and the vertical axis represents the transmissivity of the light. Curved line 501 represents the spectral characteristics of the color filter 413 of the color filter group 41. Curved line 502 represents the spectral characteristics of the color filter 423 of the color filter group 42. Although the color filter 413 and the color filter 423 are made from the same material, their thicknesses are different, the color filter 423 being thicker. Consequently, as shown in FIG. 5, the wavelength of light transmitting through the color filter 423 is longer than the wavelength of light transmitting through the color filter 413. Also, since only the thickness of the color filters is changed, the difference between the wavelength of light transmitting through the color filter 413 and the wavelength of light transmitting through the color filter 423 is small. Therefore, by changing the thickness of the color filters, the spectral characteristics of the color filter can be finely changed in accordance with the wavelength band of interest.

Figure 6:
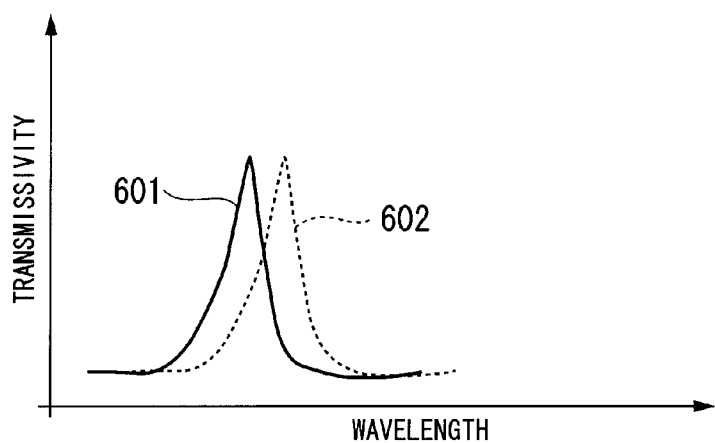
FIG. 6 is a graph of spectral characteristics of a color filter group in a first embodiment of the present invention.

Subsequently, spectral characteristics of the color filter group 41 and spectral characteristics of the color filter group 42 will be explained. FIG. 6 is a graph of the spectral characteristics of the color filter group 41 and the spectral characteristics of the color filter group 42 in this embodiment. In FIG. 6, the horizontal axis represents the wavelength of the light, and the vertical axis represents the transmissivity of the light. Curved line 601 represents the spectral characteristics of the color filter group 41. Curved line 602 represents the spectral characteristics of the color filter group 42. As shown in FIG. 6, the wavelength of light transmitting through the color filter group 42 is longer than the wavelength of light transmitting through the color filter group 41.

Thus, when the thickness of the color filter 413 in the color filter group 41 is changed to the thickness of the color filter 423 in the color filter group 42, the spectral characteristics can be finely changed from those shown by the curved line 601 to those shown by the curved line 602. That is, by changing the thicknesses of the color filters in the color filter groups, with a wavelength corresponding to target color information as a reference, it is possible to finely change the spectral characteristics of the color filter groups such that the peak values of the wavelength distribution of light that the color sensor pixels detect are within a wavelength band having a predetermined range (the wavelength band of interest) that enables variation in that color information to be extracted.

Figure 7:
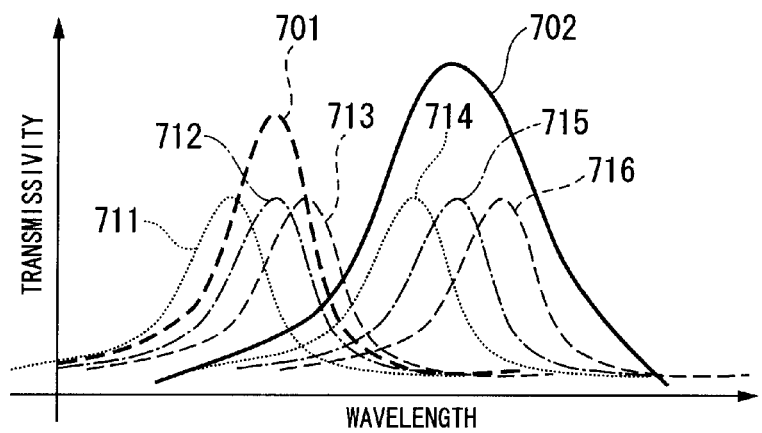
FIG. 7 is an example of spectral characteristics of a color sensor in a first embodiment of the present invention.

FIG. 7 is an example of spectral characteristics of the color sensor 12 shown in FIG. 2. In this example, a first wavelength band of interest shown by the curved line 701, and a second wavelength band of interest shown by the curved line 702, are wavelength bands for characterizing the spectral characteristics of a subject of interest. In this embodiment, light in the first wavelength band of interest (curved line 701) is detected by adjusting the spectral characteristics of the color sensor pixel 21 (curved line 711), the spectral characteristics of the color sensor pixel 22 (curved line 712), and the spectral characteristics of the color sensor pixel 23 (curved line 713), and obtaining the outputs of the color sensor pixels 21 to 23.

In addition, light in the second wavelength band of interest (curved line 702) is detected by adjusting the spectral characteristics of the color sensor pixel 24 (curved line 714), the spectral characteristics of the color sensor pixel 25 (curved line 715), and the spectral characteristics of the color sensor pixel 26 (curved line 716), and obtaining the outputs of the color sensor pixels 24 to 26. Like the color sensor pixels 21 to 23, each of the color sensor pixels 24 to 26 includes a color filter made from the first material, a color filter made from the second material, and a color filter made from the third material.

Therefore, by adjusting the thicknesses of each filters and the superimpositions thereof in the color sensor pixels 21 to 26, the spectral characteristics of the color sensor pixels 21 to 26 can easily be changed to spectral characteristics of interest. When a color sensor 12 including the color sensor pixels 21 to 26 with spectral characteristics finely adjusted to the vicinity of the wavelength of interest (wavelength band of interest) is configured in this manner, it becomes possible to precisely detect the spectral information of interest.

As described above, according to this embodiment, each of the color sensor pixels 21 to 26 provided in the color sensor 12 includes a color filter made from a first material, a color filter made from a second material, and a color filter made from a third material. By adjusting the thicknesses of the color filters of the color sensor pixels 21 to 26, it is easy to finely change the spectral characteristics of the color sensor pixels 21 to 26.

The color sensor 12 can thereby precisely acquire the spectral information of interest. Therefore, the imaging device 1 including the color sensor 12 can acquire the spectral information of interest more precisely, and with a simpler configuration.

The image processor 14 determines the type of the incident light based on the spectral information of the subject that the color sensor 12 precisely detected. Therefore, since the image processor 14 can more precisely determine the type of the incident light, the image of the subject obtained by the RGB image sensor 13 can be more precisely corrected and output as image data.

Second Embodiment

Figure 8:
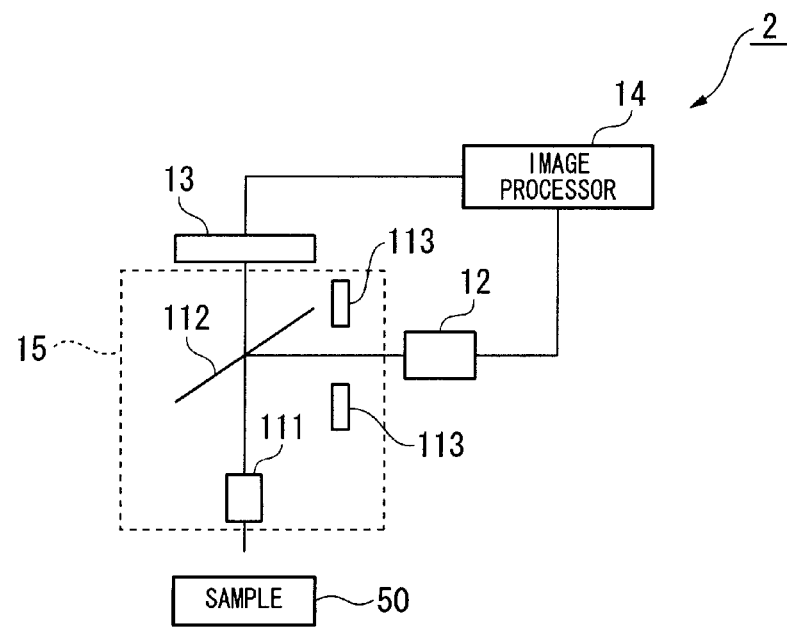
FIG. 8 is a schematic diagram of the configuration of an imaging device in a second embodiment of the present invention.

Subsequently, a second embodiment of the present invention will be explained. In an imaging device 2 in this embodiment, a pinhole is provided in a front face of the color sensor 12. FIG. 8 is a schematic diagram of the configuration of the imaging device 2 in this embodiment. In the example shown in FIG. 8, the imaging device 2 includes an optical system 15, a color sensor 12, an RGB image sensor 13, and an image processor 14. The optical system 15 includes an object lens 111, a mirror 112, and a pinhole 113 (pinhole optical system). The pinhole 113 is a plate-like member made from a material that does not transmit light, and has a hole at one point. Thus the pinhole 113 only partially transmits light that is incident to it.

Light illuminated onto a sample 50 passes the object lens 111 and is divided into two directions by the mirror 112. One beam of light divided by the mirror 112 is received by the RGB image sensor 13, and the other beam is incident to the pinhole 113. Only light that has passed through the hole in the pinhole 113 is received by the color sensor 12.

Since only light that has passed through the hole in the pinhole 113 is received by the color sensor 12, by changing the size and position of the hole in the pinhole 113, the color sensor 12 can limit the view range of the sample 50 and acquire spectral information. Therefore, the imaging device 2 of this embodiment can acquire spectral information limited only to points of interest on the sample 50.

The image processor 14 determines the type of the incident light based on the spectral information of the part of the sample 50 that is of interest detected by the color sensor 12. Therefore, since the image processor 14 can determine the type of the light illuminated onto the part of the sample 50 that is of interest, the image of the sample 50 obtained by the RGB image sensor 13 can be corrected with special regard to the part that is of interest, and output as image data.

Third Embodiment

Figure 9:
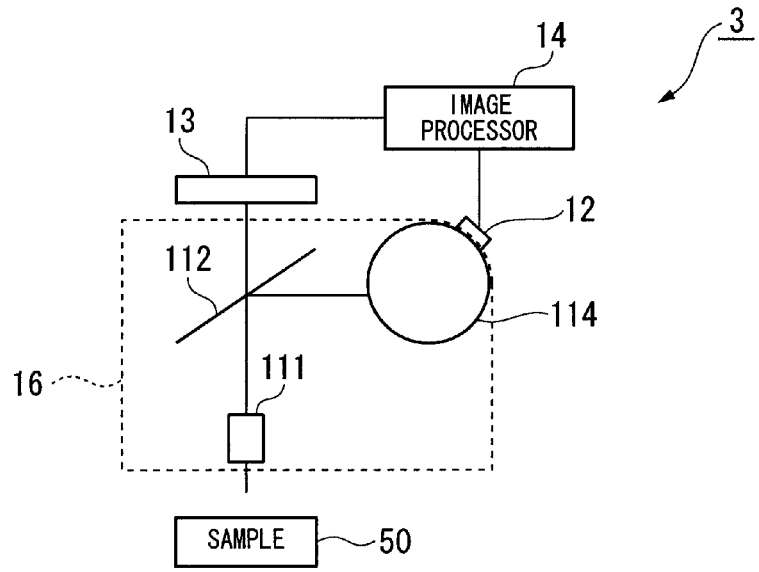
FIG. 9 is a schematic diagram of the configuration of an imaging device in a third embodiment of the present invention.

Subsequently, a third embodiment of the present invention will be explained. In an imaging device 3 in this embodiment, an integrated optical system is provided in the front face of the color sensor 12. FIG. 9 is a schematic diagram of the configuration of the imaging device 3 in this embodiment. In the example of FIG. 9, the imaging device 3 includes an optical system 16, a color sensor 12, an RGB image sensor 13, and an image processor 14. The optical system 16 includes an object lens 111, a mirror 112, and an integrating sphere 114 (integrating sphere optical system). The integrating sphere 114 mixes incident light and outputs it.

Light illuminated onto a sample 50 passes through the object lens 111 and is divided into two directions by the mirror 112. One beam of light divided by the mirror 112 is received by the RGB image sensor 13, and the other beam is incident to the integrating sphere 114. The light is evenly mixed by the integrating sphere 144, and is received by the color sensor 12.

Furthermore, since spectral information of the sample 50 (light illuminated onto the sample 50) is evenly mixed in the integrating sphere 114, the color sensor 12 can more accurately acquire spectral information of the sample 50. Therefore, the imaging device 3 in this embodiment can more accurately acquire the spectral information of the sample 50.

The image processor 14 determines the type of the incident light based on the spectral information of the sample 50 that was more accurately detected by the color sensor 12. Therefore, since the image processor 14 can more accurately determine the type of the incident light, the image of the sample 50 obtained by the RGB image sensor 13 can be corrected more accurately and output as image data.

Fourth Embodiment

Figure 10:
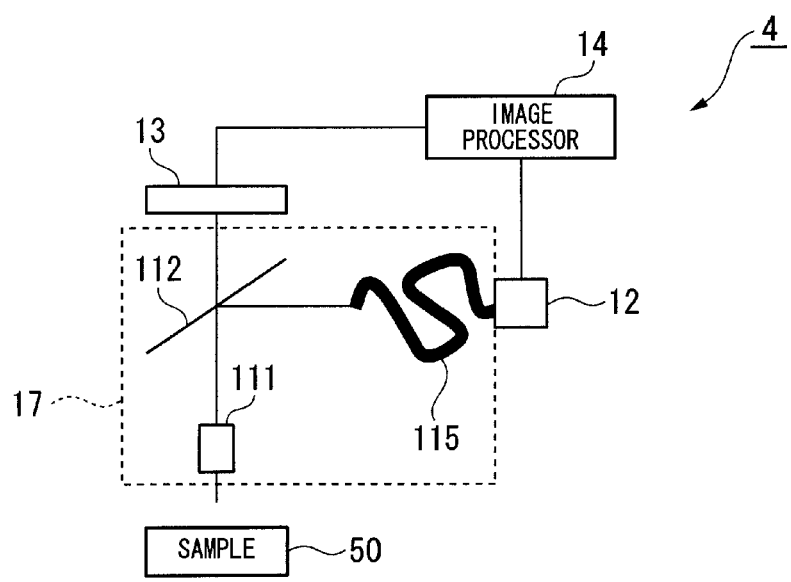
FIG. 10 is a schematic diagram of the configuration of an imaging device in a fourth embodiment of the present invention.

Subsequently, a fourth embodiment of the present invention will be explained. In an imaging device 4 in this embodiment, a fiber optical system is provided in the front face of the color sensor 12. FIG. 10 is a schematic diagram of the configuration of the imaging device 4 in this embodiment. In the example of FIG. 10, the imaging device 4 includes an optical system 17, a color sensor 12, an RGB image sensor 13, and an image processor 14. The optical system 17 includes an object lens 111, a mirror 112, and an optical fiber 115 (fiber optical system). The optical fiber 115 mixes incident light and outputs it.

Light illuminated onto the sample 50 passes through the object lens 111 and is divided into two directions by the mirror 112. One beam of light divided by the mirror 112 is received by the RGB image sensor 13, and the other beam is incident to the optical fiber 115. The light evenly mixed by the optical fiber 115 is then received by the color sensor 12.

Since spectral information of the sample 50 (light illuminated onto the sample 50) is mixed evenly by the optical fiber 115, the color sensor 12 can more accurately acquire spectral information of the sample 50. A space (region) for providing the optical fiber 115 can acceptably be small. Therefore, the imaging device 4 in this embodiment can more accurately acquire the spectral information of the sample 50 while using less space.

The image processor 14 determines the type of the incident light based on the spectral information of the sample 50 that was more accurately detected by the color sensor 12. Therefore, since the image processor 14 can more accurately determine the type of the incident light, the image of the sample 50 obtained by the RGB image sensor 13 can be corrected more accurately and output as image data.

Fifth Embodiment

Figure 11:
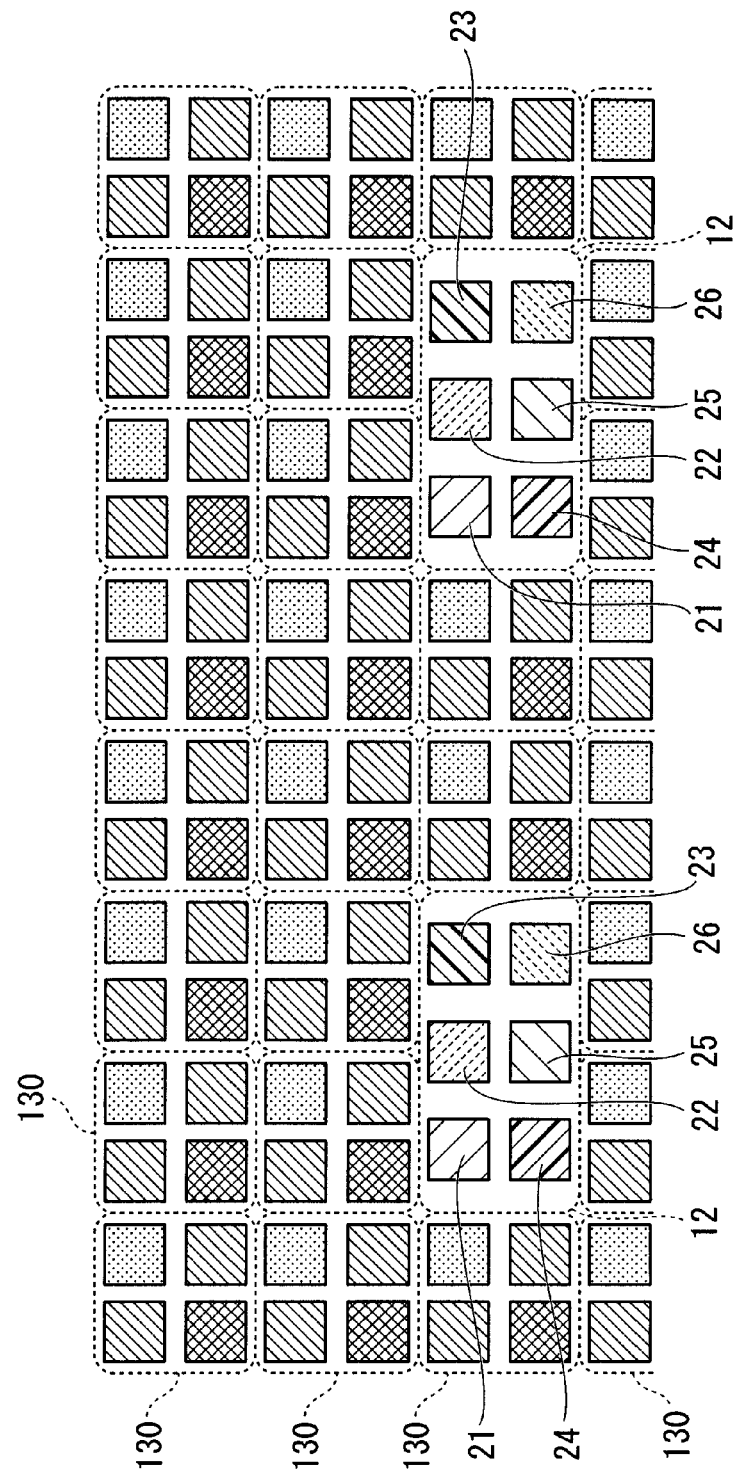
FIG. 11 is a schematic diagram of the arrangement of an RGB image sensor and a color sensor in a fifth embodiment of the present invention.

Subsequently, a fifth embodiment of the present invention will be explained. In an imaging device 5 in this embodiment, the color sensor 12 is provided inside the RGB image sensor 13. FIG. 11 is a schematic diagram of the arrangement of the RGB image sensor 13 and the color sensor 12 in this embodiment. In the example shown in FIG. 11, color sensors 12 are arranged cyclically in a Bayer pattern of RGB pixels of the RGB image sensor 13. Specifically, the color sensor 12 and two Bayer pixels 130 are alternately arranged in the third row up from Bayer pixels 130. In this example, the Bayer pixels 130 include one R pixel, two G pixels, and one B pixel.

Figure 12:
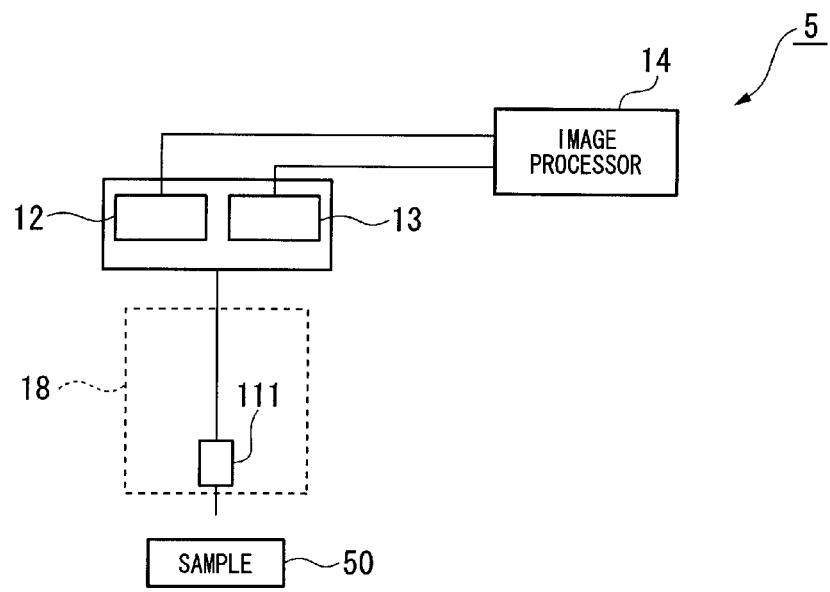
FIG. 12 is a schematic diagram of the configuration of an imaging device in a fifth embodiment of the present invention.
Figure 13:
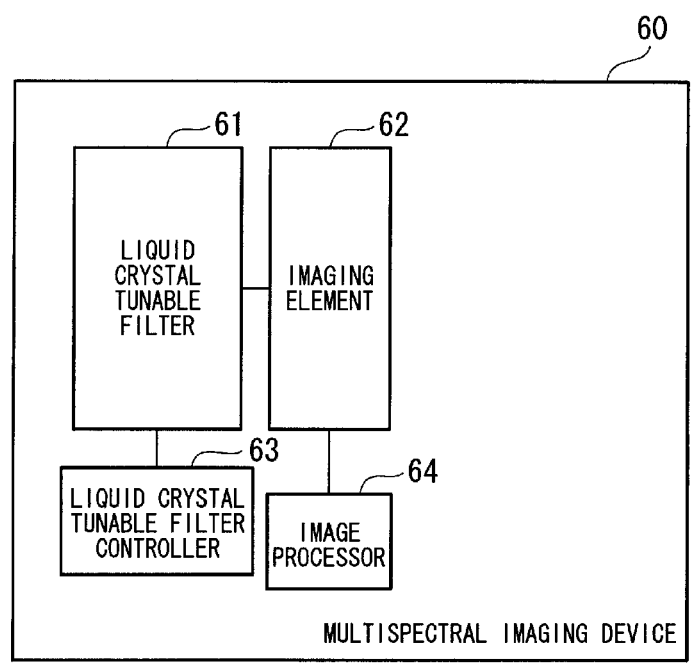
FIG. 13 is a block diagram of the configuration of a multispectral imaging device of the related art.
Figure 14:
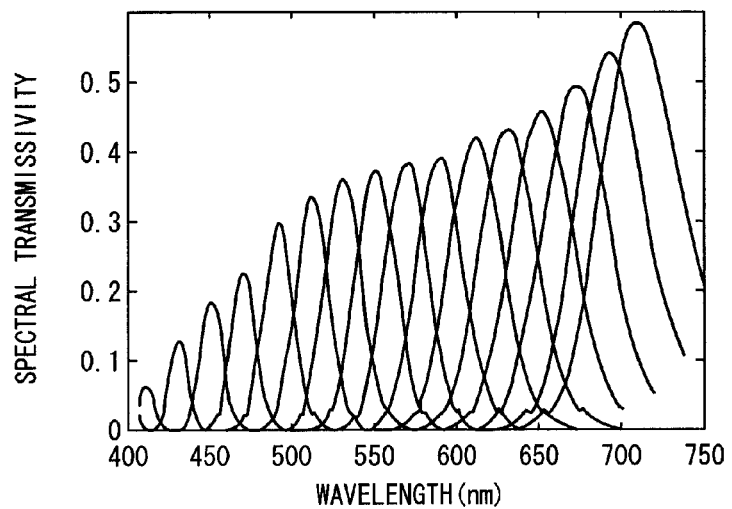
FIG. 14 is a graph of an example of spectral characteristics of a liquid crystal tunable filter of the related art.
Figure 15:
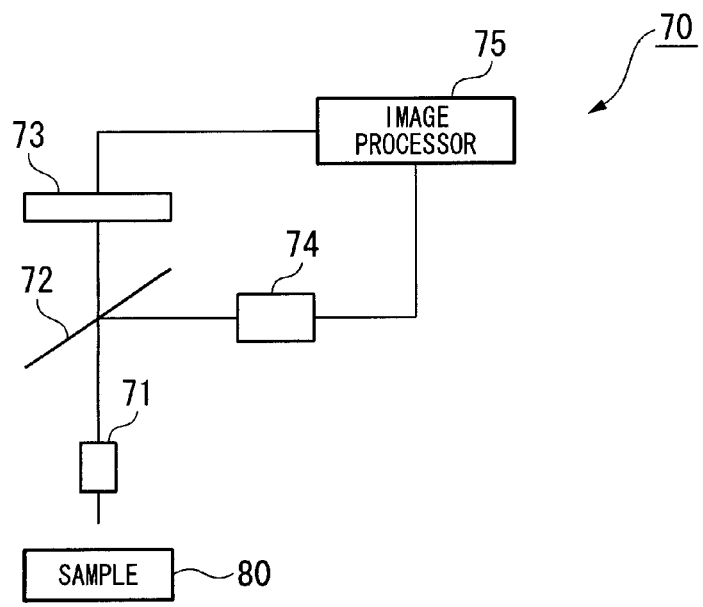
FIG. 15 is a schematic diagram of the configuration of an imaging device including a miniature spectrometer of the related art.

FIG. 12 is a schematic diagram of the configuration of the imaging device 5 in this embodiment. The imaging device 5 includes an optical system 18, a color sensor 12, an RGB image sensor 13, and an image processor 14. The optical system 18 includes an object lens 111. Light illuminated onto the sample 50 passes through the object lens 111 and is received by the RGB image sensor 13 and by the color sensor 12 arranged in the Bayer pattern of the RGB image sensor 13.

According to a configuration that the color sensors 12 are arranged cyclically in the Bayer pattern of the RGB image sensor 13, there is no need to divide the light illuminated onto the sample 50 into two directions. Thereby the configuration of the optical system can be simplified. Therefore, the imaging device 5 of this embodiment can precisely acquire the spectral information of the sample 50 with a simpler configuration.

The image processor 14 determines the type of the incident light based on the spectral information of the sample 50 that was more accurately detected by the color sensor 12. Therefore, since the image processor 14 can more accurately determine the type of the incident light, the image of the sample 50 obtained by the RGB image sensor 13 can be corrected more accurately and output as image data.

While the first embodiment to the fifth embodiment have been described above with reference to the drawings, the specific configuration is not limited to these embodiments, and can be designed within the scope of the main points of the invention.

For example, while the color sensor pixel in the examples described above includes three color filters, this is not to be considered limitative; the color sensor pixel need only include two or more color filters.

Also, while the color sensor in the examples described above includes six color sensor pixels, this is not to be considered limitative; the color sensor need only include two or more color sensor pixels.

While preferred embodiments of the invention have been described and illustrated above, these embodiments are not limitative of the invention. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. An imaging device comprising:
a color sensor comprising a first color sensor pixel and a second color sensor pixel;
the first color sensor pixel comprising:
a first color filter made from a first material for transmitting light having a first wavelength band,
a second color filter made from a second material for transmitting light having a second wavelength band and superimposed on the first color filter, and
a first color sensor element that is superimposed on the first color filter and the second color filter, and receives light that has passed through the first color filter and the second color filter;
the second color sensor pixel comprising:
a third color filter made from the first material,
a fourth color filter made from the second material, superimposed on the third color filter, and being thicker than the second color filter, and
a second color sensor element that is superimposed on the third color filter and the fourth color filter, and receives light that has passed through the third color filter and the fourth color filter,
wherein the first material and the second material are any of pigment-type organic material or dyeing-type organic material,
wherein a first peak of a first wavelength distribution of a first light detected in the first color sensor pixel is shorter than a second peak of a second wavelength distribution of a second light detected in the second color sensor pixel, and
wherein the first wavelength band and second wavelength band overlap.

2. The imaging device according to claim 1, wherein the thicknesses of the first to the fourth color filters are set such that the first peak and the second peak are within a predetermined wavelength band that enables variation in predetermined color information to be extracted.

3. The imaging device according to claim 1, further comprising:
an image sensor comprising a plurality of image sensor pixels that acquires an image of a sample; and
an optical system that forms an image of light from the sample at the image sensor, and receives the light at the color sensor.

4. The imaging device according to claim 3, wherein:
the color sensor comprises a plurality of color sensor pixels including the first color sensor pixels and the second color sensor pixels;
the plurality of image sensor pixels are arranged in a Bayer pattern; and
the plurality of color sensor pixels are arranged at a predetermined cycle in the Bayer pattern.

5. The imaging device according to claim 3, wherein:
the optical system comprises a pinhole optical system; and
the pinhole optical system makes the color sensor receive only a part of the light from the sample.

6. The imaging device according to claim 3, wherein:
the optical system comprises an integrating sphere optical system; and
the integrating sphere optical system mixes light from the sample, and makes the color sensor receive the mixed light.

7. The imaging device according to claim 3, wherein:
the optical system comprises a fiber optical system; and
the fiber optical system mixes light from the sample, and makes the color sensor receive the mixed light.

* * * * *